May 20, 1958     H. W. RIMBACH     2,835,636
CERIUM-ACTIVATED MAGNESIUM METAPHOSPHATE
PHOSPHOR, WITH AND WITHOUT MANGANESE
Filed Jan. 7, 1954
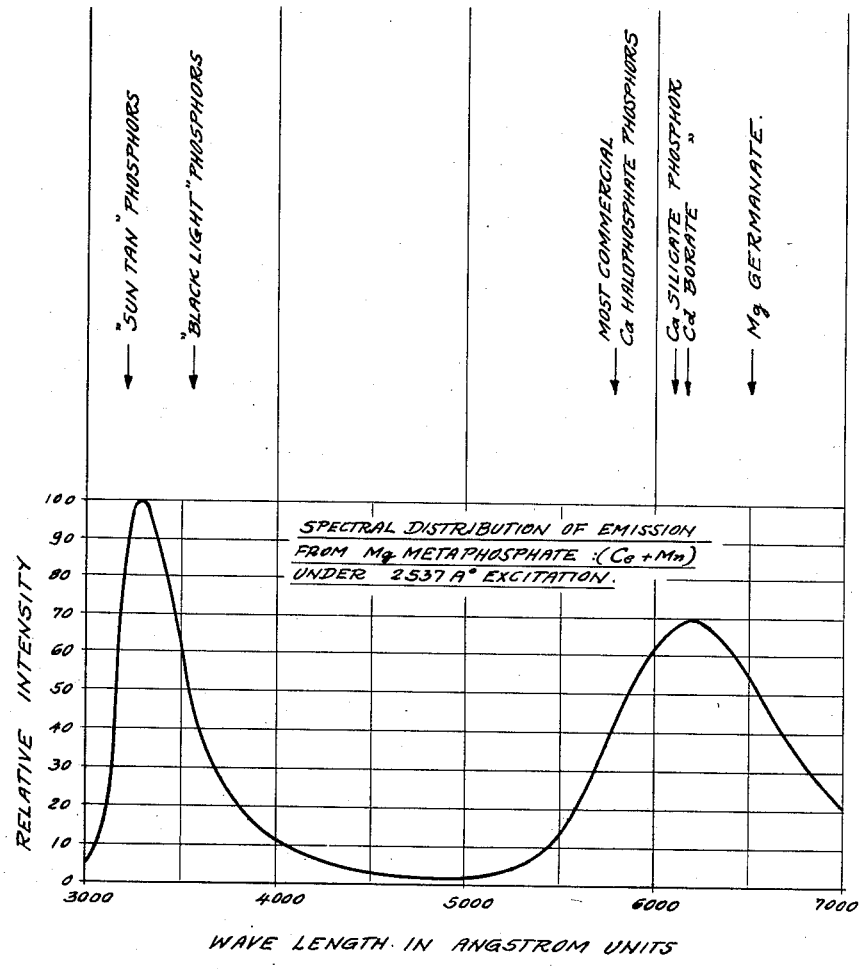
INVENTOR.
H. W. RIMBACH

United States Patent Office 2,835,636
Patented May 20, 1958

2,835,636
CERIUM-ACTIVATED MAGNESIUM METAPHOSPHATE PHOSPHOR, WITH AND WITHOUT MANGANESE

Henry W. Rimbach, Bloomfield, N. J., assignor to Westinghouse Electric Corporation, East Pittsburgh, Pa., a corporation of Pennsylvania Application January 7, 1954, Serial No. 402,637

11 Claims. (Cl. 252—301.4)

This invention relates to phosphors, methods of making and, more particularly, to a magnesium metaphosphate phosphor activated by manganese and/or cerium.

An object of my invention, generally considered, is to produce a cerium-activated magnesium metaphosphate phosphor, with or without manganese, to emit yellow-orange, orange or orange-red light, or ultra-violet radiation, as desired, in accordance with its composition, when excited by a band of 2537 A. U. radiation.

Another object of my invention is to produce a phosphor responsive to radiation adjacent 3650 A. U. with a development of a pink fluorescence and a brief red phosphorescence.

A further object of my invention is to produce a phosphor which may be fired in air, as distinguished from a reducing atmosphere, and in which the optimum molar ratio of metal to phosphorus lies between 1 to 1.80 and 1 to 2.30.

A still further object of my invention is to produce a magnesium metaphosphate phosphor, desirably activated by both cerium and manganese, for obtaining visible light and in which no appreciable visible fluorescence is obtained under 2537 A. U. excitation when cerium alone is used as the activator.

Other objects and advantages will become apparent as the description proceeds.

Referring to the drawing, the sole figure is a graph showing the spectral distribution of emission from magnesium metaphosphate embodying my invention and activated by both cerium and manganese, when excited by 2537 A. U. radiation.

In accordance with the present application, I have developed a magnesium metaphosphate phosphor activated by manganese and/or cerium, and when doubly activated giving an orange, orange-red or yellow orange fluorescence under filtered 2537 A. U. excitation, similar to that of cadmium borate.

In contrast with such well-known cerium-activated phosphors as calcium phosphate, which are preferably fired under reducing conditions, the present phosphor is fired in air. Another unusual feature is the fact that the optimum molar ratio of the total metal to phosphorus lies between 1 to 1.80 and 1 to 2.30, whereas in most commercial phosphate phosphors, such as the halophosphates and the calcium phosphate referred to above, the preferred molar ratio of total metal to phosphorus lies approximately between 1.00 to 0.60 and 1.00 to 0.80. My phosphor is also slightly responsive to the 3650 A. U. band, giving a pink fluorescence and a brief red phosphorescence.

The following is an example of one method of preparing one embodiment of my invention. A mixture is made of 390 grams of magnesium acid phosphate, $MgHPO_4$; 96 grams of manganese phosphate, 35% manganese, $Mn_3(PO_4)_2$; 12 grams of cerium phosphate, 60% cerium, $CePO_4$; 420 grams of di-ammonium acid phosphate, $(NH_4)_2HPO_4$; and fired at between 700° C. and 800° C. in air in a covered silica container or containers. It is then remilled with about 1% of di-ammonium acid phosphate and refired as before. Its brightness may be improved by washing with water.

Calculations based on a quantitative analysis of one of these phosphors gives the following molar composition of the essential constituents:

| | Moles |
|---|---|
| Mg | 3.80 |
| Mn | 0.64 |
| Ce | 0.17 |
| P | 10.40 |

The maximum useful manganese concentration would be about 3.8 moles, and the useful cerium content would extend to about 3.8 moles. At both these values the phosphor is appreciably poisoned by the activators.

Phosphors embodying the present invention may also be described as materials having the following molar composition:

$$wMgO \cdot xP_2O_5 : yMnO : zCe_2O_3$$

in which the optimum range of the ratio $$\frac{x}{w+y+3z}$$

is about 0.95 to 1.10, and the useful limits of this ratio are about 0.90 to 1.15. The optimum range of the expression $$\frac{2z+y}{w}$$

is about .20 to .60. The useful range of this is about 0.08 to 1.00, depending upon the type of emission spectrum desired. The use of the terms MnO and $Ce_2O_3$ in the foregoing is conventional only and not intended as a statement of the valences of the two activating metals in the phosphor. In the case of activation by cerium alone, the ratio $$\frac{x}{w+3z}$$

is from 0.90 to 1.15 and the ratio $$\frac{2z}{w}$$

is from .08 to 1.00.

The following table contains examples of typical current formulations for the preparation of some of these phosphors, with brief descriptions of the resulting materials, including composition data as determined by chemical analysis. Since di-ammonium acid phosphate decomposes during the firing of these formulations, more or less of the $P_2O_5$ may be lost. Therefore, the di-ammonium acid phosphate figures are subject to some adjustment, depending upon the method of processing. Refiring with a small amount (e. g. up to 3%) of di-ammonium acid phosphate is sometimes desirable.

The actual compositions of the finished products, as listed in the table, are of course more accurate descriptions of the phosphors than the raw mix formulations, and obviously could be arrived at in many ways. For example Mn and Ce have been introduced as the carbonates, and $MgHPO_4$, $Mg_2P_2O_7$, or $Mg_3(PO_4)_2$ have been used instead of magnesium carbonate, the $(NH_4)_2HPO_4$ in all cases being adjusted to give the required end product. Also, all of the metals might be introduced as metaphosphates. In general, these phosphors are fired in the temperature range 700° C. to 800° C.

TABLE 1

*Examples of the preparation, composition and properties of some magnesium metaphosphatic phosphors activated by Ce and (Ce+Mn)*

| | 1 | 2 | 3 | 4 | 5 | 6 |
|---|---|---|---|---|---|---|
| Raw Mix: | | | | | | |
| MgCO₃ | 202 | 202 | 202 | 202 | 202 | 202. |
| (NH₄)₂HPO₄ | 745 | 770 | 871 | 800 | 788 | 765. |
| Mn₂P₂O₇ | | 27 | 110 | 54 | 54 | 110. |
| CePO₄ | 93 | 93 | 93 | 47 | 93 | |
| (grams or parts by wt.) | | | | | | |
| Typical Firing Schedule | 750° for 1 hour in covered silica trays. Refire at 750° C. for ½ hour in covered silica trays with 1% (NH₄)₂HPO₄. | | | | | |
| Color of fluorescence under filtered (Corning #7-54) 2537A. excitation. | U. V. | Yellow Orange | Orange Red | Orange | Orange | |
| Color of fluorescence under filtered (Corning #7-60) 3650A. excitation. | | Weak Red | Red | Med. Red. | Med. Red. | Red. |
| Molar ratio: $\frac{P}{2(Mg+Mn)+3Ce}$ in finished phosphor. | 1.01 | 1.01 | 1.02 | 1.08 | 0.97 | 1.03 |
| Percent Mn in finished phosphor | | 1.65 | 5.6 | 3.3 | 3.1 | 6.9 |
| Percent Ce in finished phosphor | 9.4 | 8.8 | 7.25 | 4.45 | 8.3 | |

Combining the above examples, #1 through #6, the ranges of the raw-mix constituents in about the stated proportions by weight are: magnesium carbonate, 202 parts; di-ammonium acid phosphate, from 745 to 871 parts; manganese pyrophosphate, from 0 to 110 parts; and cerium phosphate from 93 to 0 parts, and in which only one of the manganese and cerium compounds is zero.

In the foregoing table, phosphors #1, #2 and #3 present the approximate optimum molar ratio of total metal to phosphorous, while #4 and #5 respectively represent the approximate lower and upper limits of the useful range of this ratio. An appreciable decrease in brightness response to 2537 A. U. excitation occurs beyond both of the latter two limits. Phosphor #1 is an ultra-violet radiation emitting material having an emission peak at about 3300 A. U. under 2537 A. U. excitation. Phosphors #2, #3 and #4 illustrate the type of color variation obtainable with change in Mn concentration. Phosphor #6 is an example of a phosphor activated by manganese only and significantly responsive to only the longer wave ultra-violet radiations. These phosphors are disclosed as magnesium metaphosphate phosphors but the data presented show that they are not equivalent. The activator cerium is added in the Ce⁺⁺⁺ state, and the phosphors are fired in air. When fired in reducing atmospheres, such as H₂ or H₂+H₂O, they lose brightness, while O₂ firing appears to have little if any harmful effect. While this is not sufficient evidence to support the conclusion that the cerium approaches or reaches the Ce⁺⁺⁺⁺ state, it is a point of distinction between the processing of these phosphors and many known phosphors, using Ce as an activator, in which at least part of the crystallization is preferably carried out under reducing conditions. Calcium phosphate; Ce; calcium phosphate: (Ce+Mn); Mg pyrophosphate: (Ce+Th); and Mg pyrophosphate: (Ce+Th+Mn); are examples.

Under 2537 A. U. excitation, most of the (Ce+Mn) activated phosphors of this group show two emission bands, one peaking at about 6200 A. U. and extending from about 5300 A. U. in the green to perhaps 7500 A. U. in the deep red, and the other a UV band peaking near 3300 A. U. and extending from slightly below 3000 A. U. to the visible violet at 4200 A. U. or 4300 A. U. The curve of the drawing represents the emission of a phosphor embodying my invention and containing about 4% Mn and 9% Ce. In general, increasing Mn tends to suppress the UV band and shifts the red peak toward the longer wave lengths. Decreasing Mn causes an intensification of the UV band and a shift of the red peak toward the shorter wave lengths. When Ce is the sole activator (phosphor #1 is an example) the phosphor emits in the UV only under 2537 A. U. excitation, and there is little response to 3650 A. U. excitation.

When Mn is the sole activator (phosphor #6 is an example) there is no significant response to 2537 A. U. radiation, but under 3650 A. U. excitation there is an appreciable but not strong red fluorescence, which also characterizes the Ce+Mn phosphors. The locations of the peaks of several common phosphors have been indicated on the curve, and it will be noted that the UV peak of the subject phosphors falls between those of the so-called "Suntan" and "Black Light" phosphors. The red band is, in general, similar to that of the cadmium borate phosphor.

In other words, the drawing shows a typical spectrum of emission from one embodiment of our magnesium metaphosphate phosphor activated by both cerium and manganese when under 2537 A. U. excitation. From this it will be seen that there is a band in the ultra-violet region peaking at about 3300 A. U., that is between the peaks for "suntan" phosphors and "black-light" phosphors. The band in the visible peaks at about 6200 A. U., or at about the same position as the peak for a cadmium borate phosphor, and between the peaks for most commercial calcium halophosphate phosphors and the magnesium germanate phosphor. It will therefor be seen that this phosphor gives an emission which appears orange-red like phosphor No. 3 of the foregoing table. Under filtered 3650 A. U. excitation, the band in the visible will be shifted toward the red, as contrasted with that under 2537 A. U., as indicated by said table.

Although preferred embodiments have been disclosed, it will be understood that modifications may be made without departure from the spirit and scope of my invention.

I claim:

1. A phosphor for fluorescent lamps consisting of the fired reaction product of following constituents in about the stated proportions by weight: magnesium carbonate, 202 parts; di-ammonium acid phosphate, from 745 to 871 parts; manganese pyrophosphate, from 0 to 110 parts; and cerium phosphate from 93 to 0 parts, and in which only one of the manganese and cerium compounds is zero, said phosphor having been fired in an oxygen-containing atmosphere at a temperature in the range of 700° C. to 800° C.

2. A phosphor for fluorescent lamps consisting of the fired reaction product of the following constituents in about the stated proportions by weight: magnesium carbonate, 202 parts; die-ammonium acid phosphate, 745 parts; and cerium phosphate, 93 parts, said phosphor having been fired in an oxygen-containing atmosphere at a temperature in the range of 700° C. to 800° C.

3. A phosphor for fluorescent lamps consisting of the fired reaction product of the following constituents in about the stated proportions by weight: magnesium carbonate, 202 parts; di-ammonium acid phosphate, 770 parts; manganese pyrophosphate, 27 parts; and cerium phosphate 93 parts, said phosphor having been fired in an oxygen-containing atmosphere at a temperature in the range of 700° C. to 800° C.

4. A phosphor for fluorescent lamps consisting of the fired reaction product of the following constituents in about the stated proportions by weight: magnesium carbonate, 202 parts; di-ammonium acid phosphate, 871 parts, manganese pyrophosphate, 110 parts; and cerium phosphate, 93 parts, said phosphor having been fired in an oxygen-containing atmosphere at a temperature in the range of 700° C. to 800° C.

5. A phosphor for fluorescent lamps consisting of the fired reaction product of the folowing constituents in about the stated proportions by weight: magnesium carbonate, 202 parts; di-ammonium acid phosphate, 800 parts; manganese pyrophosphate, 54 parts; and cerium phosphate, 47 parts, said phosphor having been fired in an oxygen-containing atmosphere at a temperature in the range of 700° C. to 800° C.

6. The method of making a phosphor for fluorescent lamps comprising ballmilling a mixture of the following constituents in about the stated proportions by weight: 390 parts of magnesium acid phosphate; 96 parts of manganese phosphate containing 35% of manganese; 12 parts of cerium phosphate containing 60% cerium; and 420 parts of di-ammonium acid phosphate; firing at a temperature between 700° C. and 800° C., in an air atmosphere in a covered inert refractory container, remilling with about 1% of ammonium acid phosphate, refiring as before, and washing with water, thereby obtaining a phosphor having about the following molar ratio of the essential parts:

3.80 Mg
0.64 Mn
0.17 Ce
10.40 P

7. A phosphor for fluorescent lamps having the following molar composition:

$$wMgO \cdot xP_2O_5$$

and activated by one of the group consisting of $zCe_2O_3$ and $zCe_2O_3$ plus $yMnO$; in the case of activation by $Ce_2O_3$ plus $MnO$ the ratio $$\frac{x}{w+y+3z}$$

is from about 0.90 to about 1.15 and the ratio $$\frac{2z+y}{w}$$

is from about 0.08 to about 1.00; in the case of activation by $Ce_2O_3$ the ratio $$\frac{x}{w+3z}$$

is from 0.90 to 1.15 and the ratio $$\frac{2z}{w}$$

is from 0.08 to 1.00; said phosphor having been fired during preparation in an oxygen-containing atmosphere at a temperature lying in the range of 700° to 800° C.

8. A phosphor for fluorescent lamps having the following molar composition: $wMgO \cdot xP_2O_5$ and activated by one of the group consisting of $zCe_2O_3$ and $zCe_2O_3$ plus $yMnO$; in the case of activation by $Ce_2O_3$ plus $MnO$ the ratio $$\frac{x}{w+y+3z}$$

is from about 0.95 to about 1.10 and the ratio $$\frac{2z+y}{w}$$

is from about 0.20 to about 0.60; in the case of activation by $Ce_2O_3$ the ratio $$\frac{x}{w+3z}$$

is from 0.90 to 1.15 and the ratio $$\frac{2z}{w}$$

is from 0.08 to 1.00, said phosphor having been fired during preparation in an oxygen-containing atmosphere at a temperature lying in the range of 700° C. to 800° C.

9. A phosphor for fluorescent lamps having the following molar composition: $wMgO \cdot xP_2O_5$ and activated by $zCe_2O_3$ plus $yMnO$, the ratio $$\frac{x}{w+y+3z}$$

being from about 0.90 to about 1.15 and the ratio $$\frac{2z+y}{w}$$

being from about 0.08 to about 1.00, said phosphor having been fired during preparation in an oxygen-containing atmosphere at a temperature lying in the range of 700° C. to 800° C.

10. A phosphor for fluorescent lamps having the following molar composition: $wMgO \cdot xP_2O_5$ and activated by $zCe_2O_3$ plus $yMnO$, the ratio $$\frac{x}{w+y+3z}$$

being from about 0.95 to about 1.10 and the ratio $$\frac{2z+y}{w}$$

being from about 0.20 to about 0.60, said phosphor having been fired during preparation in an oxygen-containing atmosphere at a temperature lying in the range of 700° C. to 800° C.

11. A phosphor for fluorescent lamps having the following molar composition: $wMgO \cdot xP_2O_5$ and activated by $zCe_2O_3$, the ratio $$\frac{x}{w+3z}$$

being from 0.90 to 1.15 and the ratio $$\frac{2z}{w}$$

being from 0.08 to 1.00, said phosphor having been fired during preparation in an oxygen-containing atmosphere at a temperature lying in the range of 700° C. to 800° C.

References Cited in the file of this patent

UNITED STATES PATENTS 2,241,951    Huniger _____ May 31, 1941

FOREIGN PATENTS 609,711    Great Britain _____ Oct. 6, 1948